(12) United States Patent
Downey

(10) Patent No.: US 7,866,071 B1
(45) Date of Patent: Jan. 11, 2011

(54) VEHICLE LOCK BOX WITH LICENSE PLATE HOLDER

(76) Inventor: Philip L. Downey, 250 Lynbrook St., Henderson, NV (US) 89012

( * ) Notice: Subject to any disclaimer, the term of this patent is extended or adjusted under 35 U.S.C. 154(b) by 40 days.

(21) Appl. No.: 12/496,947

(22) Filed: Jul. 2, 2009

(51) Int. Cl.
*G09F 7/00* (2006.01)
(52) U.S. Cl. ............................. 40/209; 224/413; 109/50
(58) Field of Classification Search .................... 40/209, 40/205, 543, 722, 724, 732, 733; 224/413
See application file for complete search history.

(56) References Cited

U.S. PATENT DOCUMENTS

| | | | | |
|---|---|---|---|---|
| 2,158,949 | A | * | 5/1939 | Sarles et al. .................. 182/91 |
| 2,649,799 | A | * | 8/1953 | Spertus ......................... 40/721 |
| 3,263,358 | A | | 8/1966 | Dosie et al. |
| 3,284,939 | A | * | 11/1966 | Perrot ........................... 40/705 |
| 4,182,062 | A | | 1/1980 | Krokos et al. |
| 4,750,753 | A | * | 6/1988 | Dezern ..................... 280/164.1 |
| 5,056,695 | A | * | 10/1991 | Giblet ......................... 224/484 |
| 5,503,420 | A | | 4/1996 | Consiglio et al. |
| 5,979,339 | A | | 11/1999 | Smith |
| 2005/0087575 | A1 | | 4/2005 | Semsel et al. |

OTHER PUBLICATIONS

Grifter Storage Box.
Aerostich License Plate Locking Compartment.
* cited by examiner

*Primary Examiner*—Lesley Morris
*Assistant Examiner*—Shin Kim
(74) *Attorney, Agent, or Firm*—Altman & Martin; Steven K Martin

(57) ABSTRACT

A vehicle lock box with a weather-proof compartment and a license plate holder that mounts to the license plate bracket. An outer frame is comprised of a pair of hinged, rigid panels that is secured closed by the locking mechanism. Each panel has a raised lip that forms a hollow in the panel. The rear panel includes holes for mounting to the license plate bracket. The license plate is placed inside the front panel adjacent to a cutout that exposes the license plate face. The weather-proof compartment is composed of a pair of mirror image, resilient, water-impermeable sheets, each of which fits within the hollow of one of the panels. Both sheets have a raised rim that forms a depression in the sheet. The sheet in the front panel holds the license plate against the cutout. When the frame is closed, the sheet rims abut, forming a weather-tight compartment.

5 Claims, 4 Drawing Sheets

VEHICLE LOCK BOX WITH LICENSE PLATE HOLDER

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to motor vehicles, more particularly, to a vehicle license plate holder with a locked compartment.

2. Description of the Related Art

Many motorcyclist have a dilemma: where to put the registration certificate and other documents so that they are secure. This particularly a problem with motorcycles that do not have locking saddle bags or trunk. Even if the motorcycle has locking saddle bags or trunk, it may be desirable to have a place to securely store these documents and other items, such as credit cards, that is convenient rather than having to search for them in multiple places.

Motorcycle license plates also have a security problem. In most cases, the plate is mounted to a frame by two bolts that are easily removable, thereby making the plate easy to steal.

In addition to being easy to steal, license plates have exposed sharp edges that can cause damage or injury.

BRIEF SUMMARY OF THE INVENTION

An object of the present invention is to provide a secure compartment for valuables that mounts to a license plate frame of a motor vehicle.

Another object is to provide a weather-proof compartment for valuables that mounts to a license plate frame of a motor vehicle.

Yet another object is to provide a secure compartment for holding a license plate.

Yet another object is to provide a license plate holder that covers the edges of the plate.

The present invention is a lock box that mounts to a vehicle license plate bracket and that has a weather-proof compartment and a license plate holder. The lock box includes an outer frame with an inner, weather-proof bladder.

The outer frame of the box has of two panels composed of a rigid, robust material attached by a hinge. Both panels are rigid sheets with a raised perimeter lip, forming a hollow within the panel. When the frame is closed, the lips abut each other so that the hollows form an enclosed chamber that is not accessible from the outside. A locking mechanism secures the panels closed.

The bladder is comprised of a pair of mirror image, resilient, water-impermeable sheets. Each sheet fits within the hollow of one of the panels. Both sheets have a raised rim that forms a depression in the sheet.

The rear panel includes mounting holes used to mount the lock box to the vehicle. Screws are oriented so that the screw heads are within the panel hollow, making them inaccessible when the lock box is closed.

The license plate is placed inside the front panel adjacent to a cutout that exposes the face of the license plate. Each bladder sheet is placed in one panel hollow. The sheet in the front panel holds the license plate against the cutout. When the frame is closed, the sheet rims abut, whereby the depressions form a weather-tight compartment.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present invention is a lock box 10 that mounts to a license plate bracket and that has a weather-proof compartment and a license plate holder. The lock box 10 includes an outer frame 12 with a locking mechanism 16, and an inner bladder 14.

Figure 1:
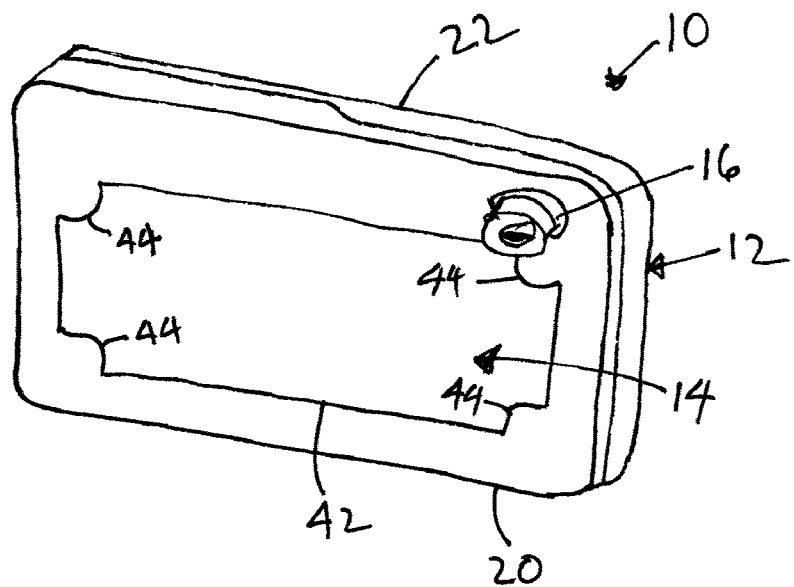
FIG. 1 is a perspective view of the lock box of the present invention in the closed position.
Figure 2:
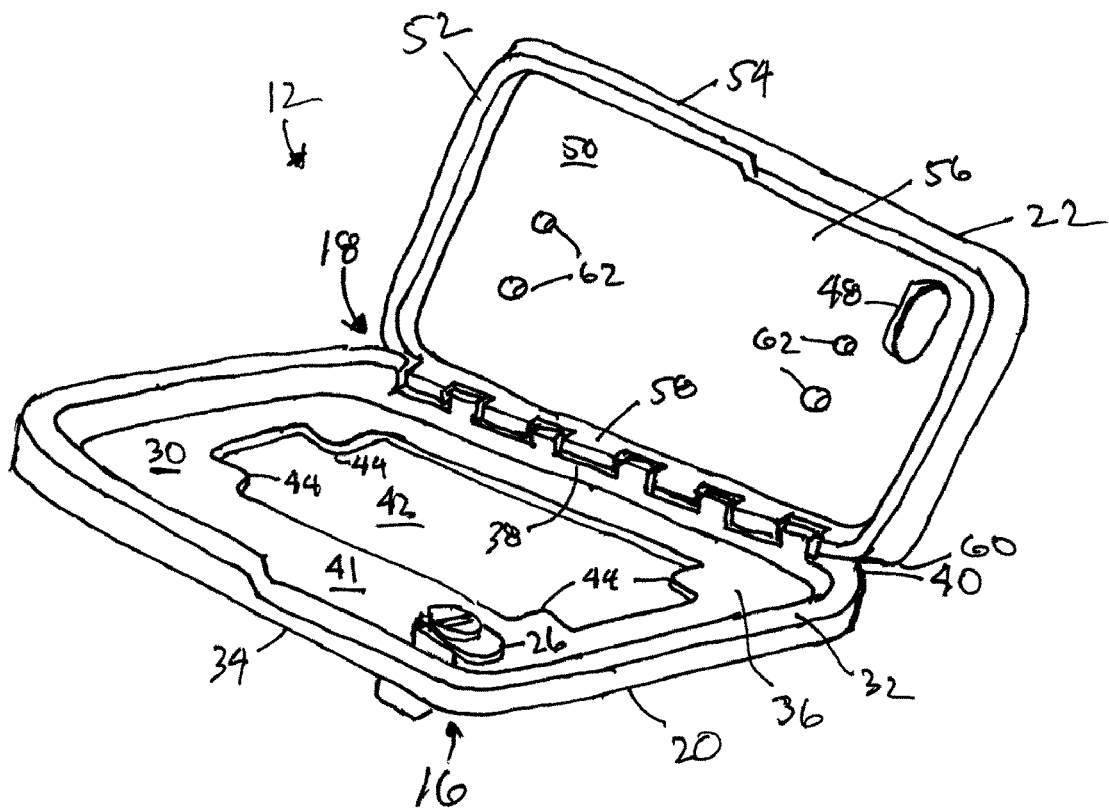
FIG. 2 is a perspective view of the frame of FIG. 1 in the open position.

As shown in FIG. 2, the frame 12 is comprised of two panels 20, 22 attached by a hinge 18.

The front panel 20 is a rigid sheet 30 with a raised lip 32 around the perimeter 34 that forms a hollow 36. The portion 38 of the lip 32 along the bottom edge 40 is shaped as described below to form one side of the hinge 18.

The rear panel 22 is a rigid sheet 50 with a raised lip 52 around the perimeter 54 that forms a hollow 56. The portion 58 of the lip 52 along the bottom edge 60 is shaped as described below to form the other side of the hinge 18.

The panels 20, 22 are composed of a rigid, tough, robust material, such as a steel or a hard plastic or carbon composite.

Figure 3:
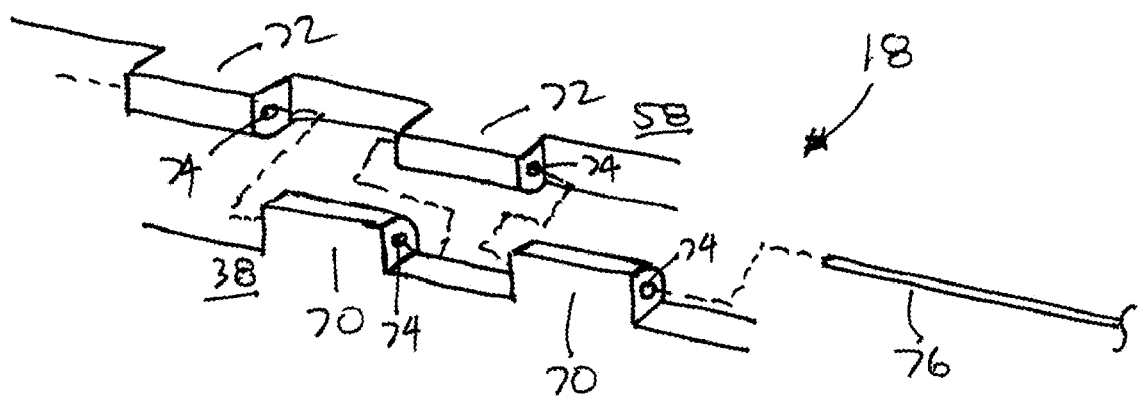
FIG. 3 is a magnified, exploded view of a portion of the hinge of FIG. 2.

In one configuration of the hinge 18, shown in FIG. 3, the front panel lip portion 38 is formed with square teeth 70 and the rear panel lip portion 58 is formed with square teeth 72 that mesh with the rear panel teeth 44. A bore 74 extends through all of the teeth 70, 72 and a rod 76 extends through the bore 74. The rod 76 operates as an axle about which the two panels 20, 22 can pivot between a closed position and an open position. This hinge configuration is robust and secure. The present invention contemplates that other robust and secure hinge configurations may be used.

When the frame 12 is in the closed position, the front panel lip 32 and the rear panel lip 52 abut each other about the entire periphery such that front panel hollow 36 and rear panel hollow 56 together form a chamber 98 into which the bladder 14 fits. When in the closed position, there is no external access to the chamber 98.

Figure 4:
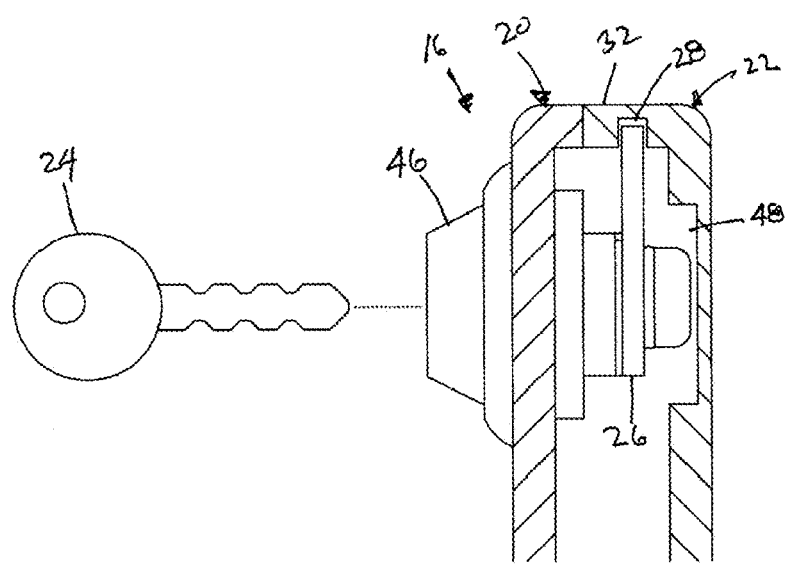
FIG. 4 is a cross-sectional view of the locking mechanism.

A locking mechanism 16 is attached to the frame 14 to secure the lock box 10 in the closed position. Many types of locking mechanisms are available and are contemplated for use in the present invention. The present embodiment, shown in FIG. 4, employs a key lock with an eccentric cam 26. When the key 24 is inserted in to the lock 46 and turned, a cam 26 rotates between a horizontal position and a vertical position. In the present configuration, as the cam 26 rotates from horizontal to vertical, it slides into a slot 28 machined into the upper rear panel lip 32, thereby preventing the lock box 10 from opening. Alternatively, the slot is machined into the side rear panel lip so that the cam slides into the slot when rotating from the vertical position to the horizontal position. Optionally, if the locking mechanism 16 extends too deeply into the frame 12, a depression 48 is formed in the rear panel 22 for additional clearance, as in FIG. 4.

Figure 5:
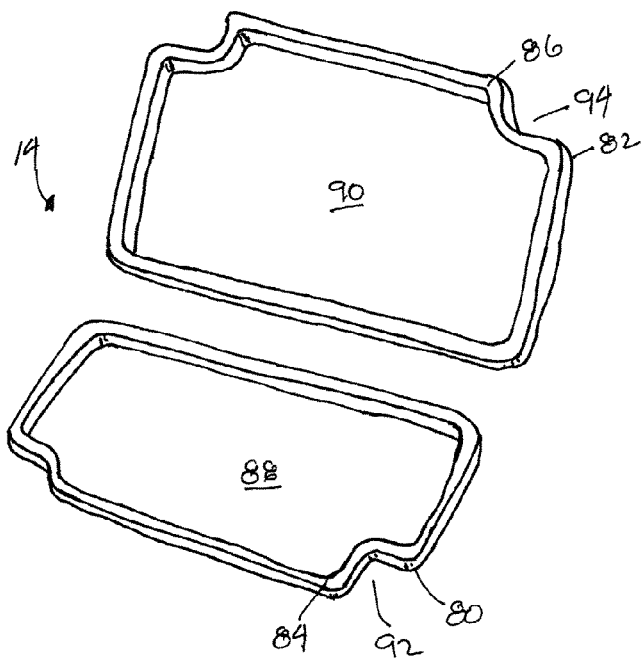
FIG. 5 is a perspective view of the bladder of FIG. 2.

As shown in FIG. 5, the bladder 14 is comprised of a pair of mirror image resilient sheets 80, 82. Each sheet 80, 82 has a raised rim 84, 86 that forms a depression 88, 90 in the sheet 80, 82. Each sheet 80, 82 is sized to fit into either the front panel hollow 36 or the rear panel hollow 56. Preferably, the sheets 80, 82 fit snuggly into the hollows 36, 56.

The resilient sheet material is water-impermeable. A preferred material is rubber, but other materials may be used. The rim 84, 86 is relatively thick to help the sheet 80, 82 retain its shape.

One corner of sheets 80, 82 has a notch 92, 94 for avoiding the locking mechanism 16 so that the locking mechanism 16 does not compromise the integrity of the compartment 96, as described below. Optionally, two corners, as in FIG. 5, or all four corners have notches so that the sheets 80, 82 can be installed without having to first orient the notches properly.

Figure 6:
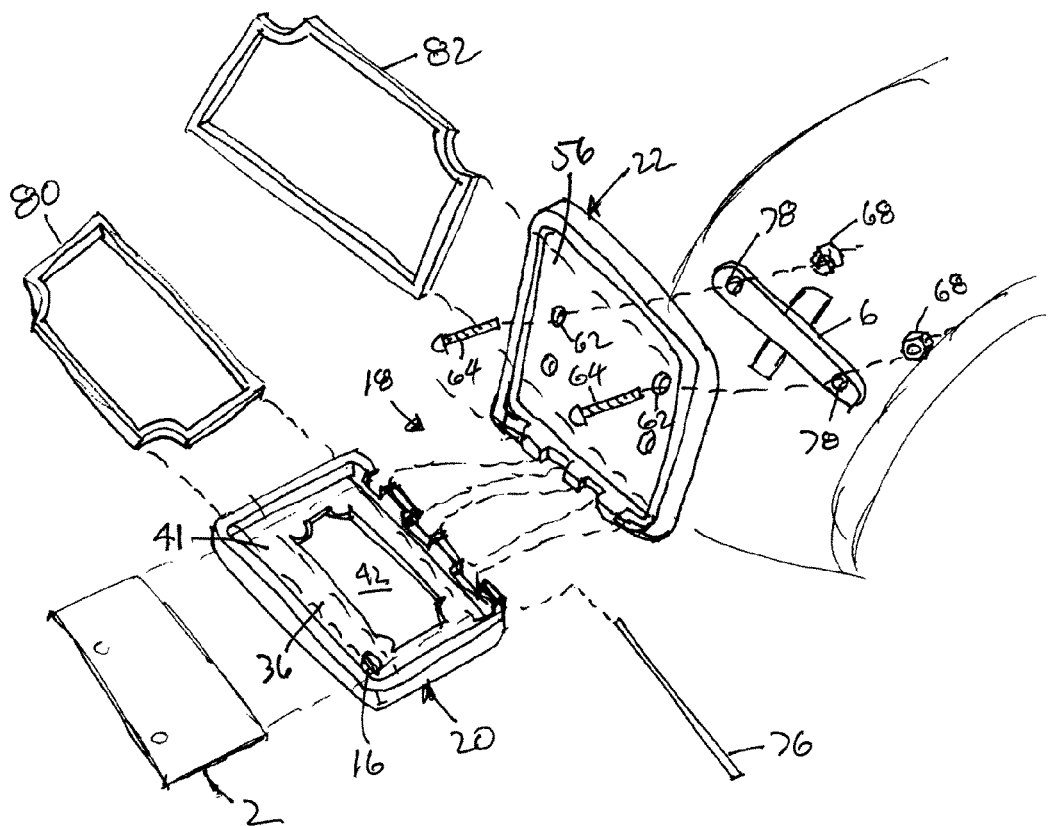
FIG. 6 is an exploded, perspective view showing how the lock box of FIG. 1 is assembled and installed.
Figure 7:
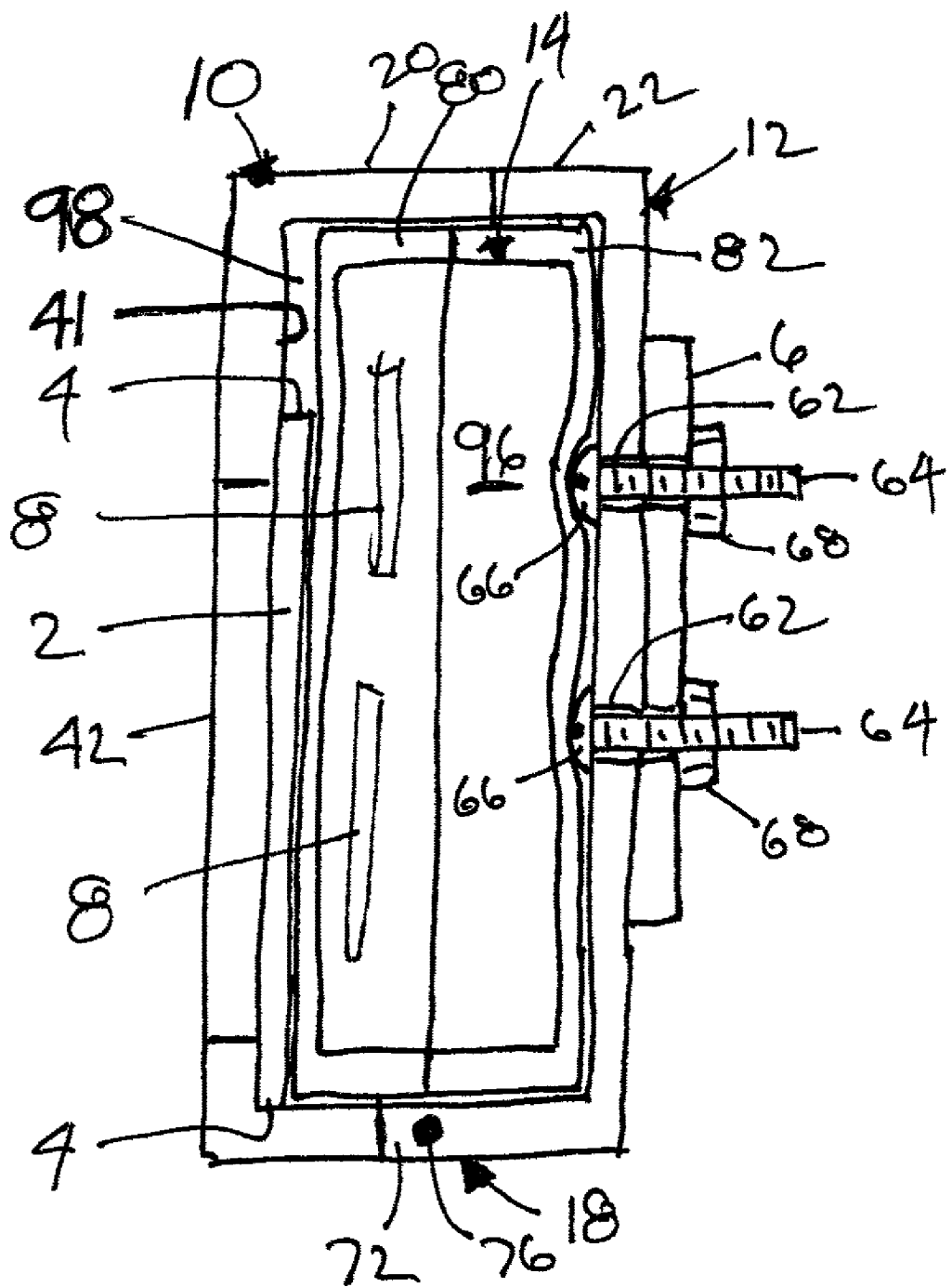
FIG. 7 is an exaggerated, cross-sectional view of the closed lock box of the present invention after installation.

FIGS. 6 and 7 show how the lock box is assembled and installed.

The rear panel 22 includes mounting holes 62. The frame 12 is mounted to holes 78 the motorcycle frame 6 with bolts 64 and nuts 68 such that the bolt heads 66 are inside the rear panel 22. In this way, when the lock box 10 is closed and locked, the bolt heads 66 are not accessible for removal.

The front panel 20 has a cutout 42 for the license plate 2. When the lock box 10 is open and before the bladder 14 is inserted, the license plate 2 is placed in the front panel hollow 36 against the inner surface 41. The bottom of the license plate 2 rests on the bottom edge 40 with the front of the license plate 2 visible through the cutout 42. The cutout 42 is positioned and sized to expose all of the required elements of the standard license plate face while securing the license plate perimeter edges 4 from exposure and accessibility outside the frame 12. Optionally, the corners of the cutout 42 extend into the cutout 42, as at 44, to provide greater security.

After the license plate 2 is placed, each bladder sheet 80, 82 is easily slipped into one of the panel hollows 36, 56, making sure that the bladder notches 92, 94 straddle the locking mechanism 16. The items to be protected 8 are placed in the lock box 10 between the bladder sheets 80, 82 into the depressions 88, 90. When the frame 12 is closed, the two bladder rims 84, 86 abut each other about the entire periphery. The bladder rims 84, 86 are of a height such that, when in the frame 12 is in the closed position, the bladder rims 84, 86 are pressed tightly together to form a weather-tight seal, making the compartment 96 formed from the two bladder depressions 88, 90 weather tight. The notches 92, 94 avoid the locking mechanism 16 so that the compartment can be weather-tight.

After the lock box 10 is closed, the key 24 is inserted into the locking mechanism 16 and turned until the cam 26 slides into the slot 28

Thus it has been shown and described a vehicle lock box with license plate holder which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A vehicle lock box comprising:
   (a) a first panel composed of a rigid, robust material and having a first panel perimeter, an inner surface, and a cutout, a first raised lip extending around said first panel perimeter forming a first hollow, said first panel adapted to receive a license plate against said inner surface such that said license plate is visible through said cutout and no perimeter edges of said license plate are accessible through said cutout;
   (b) a second panel composed of a rigid, robust material having a second panel perimeter and a second raised lip extending around said second panel perimeter forming a second hollow;
   (c) a first water-impermeable, resilient sheet having a first sheet perimeter, a first raised rim extending around said first sheet perimeter forming a first depression, said first sheet adapted to fit within said first hollow and retain said license plate against said inner surface;
   (d) a second water-impermeable, resilient sheet having a second sheet perimeter, a second raised rim extending around said second sheet perimeter forming a second depression, said second sheet adapted to fit within said second hollow;
   (e) said panels attached to each other by a hinge such that such that said panels pivot between a closed position and an open position;
   (f) said closed position being such that said first lip and said second lip abut such that said first hollow and said second hollow form a chamber without external access, and said first rim and said second rim abut such that said first depression and said second depression form a weather-tight compartment;
   (g) said open position being such that there is external access to said compartment and said chamber;
   (h) a locking mechanism having a locked position wherein said panels are retained in said closed position and an unlocked position wherein said panels can pivot to said open position; and
   (i) a mounting means for mounting said second panel to said vehicle, said mounting means being inaccessible in said closed position.

2. The lock box of claim 1 wherein said mounting means includes holes in said second panel adapted to receive screws.

3. The lock box of claim 1 wherein said locking mechanism includes a key lock with an eccentric cam mounted to said first panel and a slot in said second panel lip, said locked position being when said cam is rotated into said slot and said unlocked position being when said cam is rotated out of said slot.

4. The lock box of claim 3 wherein said sheets include at least one notch adapted to avoid said lock.

5. The lock box of claim 1 wherein said hinge is composed of meshed teeth and a rod that extends through said meshed teeth.

* * * * *